(12) United States Patent
Pauls

(10) Patent No.: US 6,185,253 B1
(45) Date of Patent: Feb. 6, 2001

(54) PERCEPTUAL COMPRESSION AND ROBUST BIT-RATE CONTROL SYSTEM

(75) Inventor: Richard Joseph Pauls, Newton, NJ (US)

(73) Assignee: Lucent Technology, Inc., Murray Hill, NJ (US)

(*) Notice: Under 35 U.S.C. 154(b), the term of this patent shall be extended for 0 days.

(21) Appl. No.: 08/961,624

(22) Filed: Oct. 31, 1997

(51) Int. Cl.[7] .................................................. H04N 7/30
(52) U.S. Cl. ................................... 375/240.02; 704/229
(58) Field of Search ......................... 375/240.02; 348/403, 348/403.1, 408, 408.1, 405, 405.1; 704/204, 229; H04N 7/30

(56) References Cited

U.S. PATENT DOCUMENTS

| | | | |
|---|---|---|---|
| 5,684,920 | * 11/1997 | Iwakami et al. | 704/204 X |
| 5,712,955 | * 1/1998 | Sonohara | 348/403 X |
| 5,731,835 | * 3/1998 | Kuchibholta | 348/405 X |
| 5,794,179 | * 8/1998 | Yamabe | 704/204 X |
| 5,801,779 | * 9/1998 | Uz et al. | 348/405 X |
| 5,929,916 | * 7/1999 | Legall et al. | 348/405 X |
| 5,974,379 | * 10/1999 | Hatanaka et al. | 704/229 X |

* cited by examiner

Primary Examiner—Howard Britton
(74) Attorney, Agent, or Firm—DeMont & Breyer, LLC; Jason Paul DeMont; Wayne S. Breyer

(57) ABSTRACT

A method of compressing a source (e.g., a video signal, a still image, an audio signal, etc.) is disclosed that does not require the transmission of changes in the quantization step size and more evenly affects the fidelity of the source than techniques in the prior art that change the quantization step size at various points in the compression process. An illustrative embodiment of the present invention involves transforming a source (e.g., a video frame, audio sample, etc.) into m coefficients, in well-known fashion, wherein each of the m coefficients is represented by a known number of bits. Then, only n of the m coefficients are used for transmission or storage, as appropriate, where the n coefficients are more perceptually significant than the m—n coefficients not used.

6 Claims, 3 Drawing Sheets

PERCEPTUAL COMPRESSION AND ROBUST BIT-RATE CONTROL SYSTEM

FIELD OF THE INVENTION

The present invention relates to data compression in general, and, more particularly, to a technique for the compression of a source (e.g., a video signal, a still image, an audio signal, etc.) based on perception, which compressed source can then be transmitted or stored, in a means that is insensitve to transmission errors.

BACKGROUND OF THE INVENTION

As is well known in the prior art, a motion picture is a temporal composite of a series of still images that are projected, one after another, so quickly that the mind does not perceive the discrete images but blends them into a coherent moving image. This is true whether the motion picture is transmitted and stored electrically as a video signal or optically on reels of acetate film.

When a motion picture is transmitted digitally, each still image, or "frame," is typically processed and transmitted individually by the video processing system. For example, FIG. 1 depicts a series of four frames of a longer sequence that depicts a person waving.

Each frame comprises a two-dimensional array of tessellated picture elements, or "pixels," which the mind perceives not as individual tiles, but as a mosaic. In a typical video processing system, a frame such as frame 102 in FIG. 1 could constitute an array of 512 by 512 pixels. Depending on the particulars of the system, each pixel can be either black or white, one of a number of shades of gray, or one of a number of colors. Typically, when each pixel can be one of $2^n$ colors, where n is a whole number, the color of each pixel is represented by n bits. Therefore, an 8-bit color video system comprising 262,144 pixels per frame nominally requires 2,097,152 bits of storage per frame.

When it is cumbersome or computationally complex to process an entire frame as a whole, the frame is often treated as an array of independent blocks, which each have a size that is more convenient for the video processing system to handle. FIG. 2 depicts frame 102 of FIG. 1, which is treated as a 32 by 32 array of blocks, in well-known fashion. Each block, therefore, comprises an array of 16 by 16 pixels.

A typical video processing system projects 24 frames per second and, therefore, the video image of FIG. 1 nominally requires 50,331,648 bits per second. When, therefore, such a video image is stored on a medium (e.g., a Digital Video Disk, semiconductor RAM, etc.) or transferred over a telecommunications channel (e.g., a Plain Old Telephone Service telephone line, an IS-95A CDMA wireless telecommunications channel, etc.), such an image can demand considerable bandwidth, even by today's standards.

To reduce the bandwidth required to transmit a video image, a technology has developed called video compression. A typical form of video compression involves motion compensated discrete cosine transform ("MCDCT") processing (e.g., MPEG). A characteristic of this type of processing is that the resulting bit-rate of a compressed video signal varies widely over time as a function of the content of the video image. For example, one frame may require 2000 bits while the next requires only 200 bits. When the compressed video bit-stream is to be sent in real time over a bandwidth-limited telecommunications channel, such as a CDMA wireless telecommunications channel, then a bit-rate control mechanism must be employed to match the variable rate of bits produced by the encoding system to the fixed capacity of the telecommunications channel. Traditionally, this is accomplished by buffering the telecommunications channel with a FIFO, whose depth is determined in accordance with well-known queueing theory techniques.

Excessive buffering, by definition, introduces excessive temporal delay into the telecommunications channel, which is antithetical to real-time transmission. Therefore, another mechanism for bit-rate control has been developed which avoids excessive buffering. Fundamentally, this mechanism sets an upper bound on the number of bits that can constitute each compressed frame to be transmitted over the telecommunications channel. The upper bound, which is known as the "bit budget," is determined, in well-known fashion, based on the bandwidth of the telecommunications channel, statistical data on the size of compressed frames unhindered by the bit budget, the acceptable amount of delay through the telecommunications channel, and queueing theory. Each frame is then compressed, and if necessary re-compressed, until the compressed frame comprises fewer bits than the bit budget.

FIG. 4 outlines the salient steps of a class of video compression methods in the prior art that incorporate a rate-control mechanism based on a bit budget. Before the method begins, a value for the bit budget is established.

As described above, each frame in a motion picture is processed individually, one after another, and therefore at step 401, the method gets one frame to be processed.

At step 403, each frame is transformed into coefficients, in well-known fashion using, for example, the 2-dimensional discrete cosine transform ("DFT"). Sometimes the frame is transformed as a whole. More typically, however, it is computationally cumbersome to transform the entire frame as a whole and, therefore, the frame is treated as an array of blocks, which are transformed and processed individually.

At step 405, each of the transform coefficients is divided into a discrete set of values that span a useful range. The number of values, or levels, used to span this range determines the precision or resolution of the quantizer, and the size of the individual levels is known as the quantization step size. The purpose of quantizing the transform coefficients is to reduce the number of bits in the compressed image by omitting details that are less perceptible. The quantization step size affects both the fidelity of the compressed image to the original and also the number of bits in the compressed image. In fact, the quantization step size is commonly used as a parameter to trade-off the number of bits in the compressed image against fidelity, as a means of rate-control. When the quantization step size is small, the compressed image generally comprises more bits and represents an image with reasonable fidelity to the original. In contrast, when the quantization step size is larger, the compressed image generally comprises fewer bits but represents an image with less fidelity to the original. Initially, the quantization step size is set to a default value.

At step 407, each of the quantized coefficients is compressed with, for example, a lossless variable-length code, such as a Huffman code, in well-known fashion.

At step 409, the total number of bits in all of the compressed coefficients is determined, in well-known fashion.

At step 411, the method determines if the total number of bits in all of the compressed quantized coefficients is within the bit budget.

When at step 411 the bit budget is not met, control passes to step 413 and the quantized step size is increased. When the quantized step size is increased, the fidelity of the compressed image suffers, but the re-compressed image will comprise fewer bits. From step 413, control passes to step 403 and the transform coefficients are re-quantized using the new quantization step size. In general, the loop through step 411 is performed until the compressed image satisfies the bit budget.

When at step 409 the bit budget is finally met, then control passes to step 413 and the compressed image is transmitted. Each time a compressed image is transmitted with a new quantization step size, then the new quantization step size must be transmitted too so that the video decoder can know how to properly interpret the quantized coefficients in the compressed image.

When the compressed image and new quantization step size are transmitted over a lossless communications channel, the compression technique depicted in FIG. 4 is generally acceptable. In contrast, when the compressed image and quantization step size are transmitted over a lossy communications channel, such as a wireless telecommunications channel, it is possible that the quantization step size can be corrupted during transmission. When that occurs, all of the subsequently transmitted quantized coefficients will be interpreted incorrectly by the video decoder until a new quantization step size is transmitted and received correctly. The result can be a corrupted video signal that can remain corrupted for several frames or seconds.

Therefore, the need exists for a bit-rate control system that is well-suited for transmission over a lossy communications channel.

There is another disadvantage of the method depicted in FIG. 4. The iterative nature of the control loop through step 405 makes the rate at which the frames are processed dependent on the content of the frames themselves, and, therefore, only a educated guess can be made at how much computation power is needed to compress a given number of frames in a given time, or how quickly a number of frames can be compressed. Therefore, the need exists for a bit-rate control system whose computational requirements are more predictable.

SUMMARY OF THE INVENTION

Some embodiments of the present invention are capable of compressing a video signal, a still image or an audio signal for transmission over an error-prone communications channel without some of the costs and disadvantages of techniques in the prior art. For example, some embodiments of the present invention do not require the transmission of changes in the quantization step size, which precludes the possibility that it will be corrupted during transmission and that subsequently transmitted transform coefficients will be incorrectly interpreted by the receiver.

Furthermore, some embodiments of the present invention use a non-iterative approach to compression and, therefore, lend themselves to predictable computational requirements. Because each frame is processed only once, and not iteratively, there is less real-time delay in transmitting the frames than in the prior art. And still, furthermore, some embodiments of the present invention affect the fidelity of the source to be compressed more evenly than techniques that change the quantization step size at various points in the compression process.

In the prior art, increases in the quantization step size affect all of the transform coefficients evenly. But the perceptual significance of the transform coefficients is not the same, and, therefore, an increase in the quantization step size coarsens the more perceptually significant coefficients evenly with the less perceptually significant coefficients. In accordance with an illustrative embodiment of the present invention the more perceptually significant coefficients are transmitted or stored, as appropriate, and only so many of the less perceptually significant coefficients are discarded as is necessary to ensure that the encoded coefficients satisfy the bit budget.

And still furthermore, some embodiments of the present invention are capable of creating an output bit-stream that is completely compatible with existing video coding standards, such as MPEG, ITU H.261 and H.263, which greatly increases the utility of the embodiments and avoids the necessity of passing standards changes to take advantage of technological improvements.

These advantages are obtainable in an illustrative embodiment of the present invention that comprises the steps of transforming a source (e.g., a video frame, audio sample, etc.) into m coefficients, in well-known fashion, wherein each of the m coefficients is represented by a known number of bits. Then, only n of the m coefficients are used for transmission or storage, as appropriate, where the n coefficients are more perceptually significant than the m−n coefficients not used.

DETAILED DESCRIPTION

Figure 1:
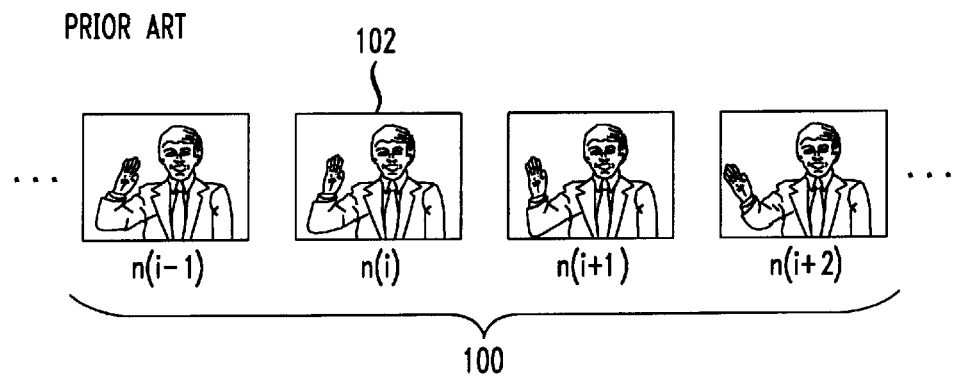
FIG. 1 depicts a drawing of four frames from a motion picture that depicts a person waving.
Figure 2:
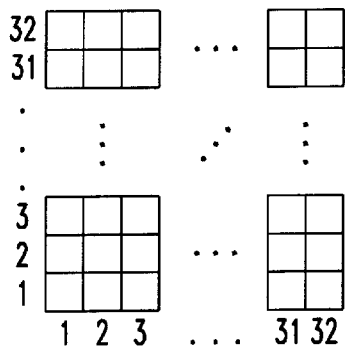
FIG. 2 depicts a drawing of one frame in FIG. 1 and the 32 by 32 array of blocks that constitutes it.
Figure 3:
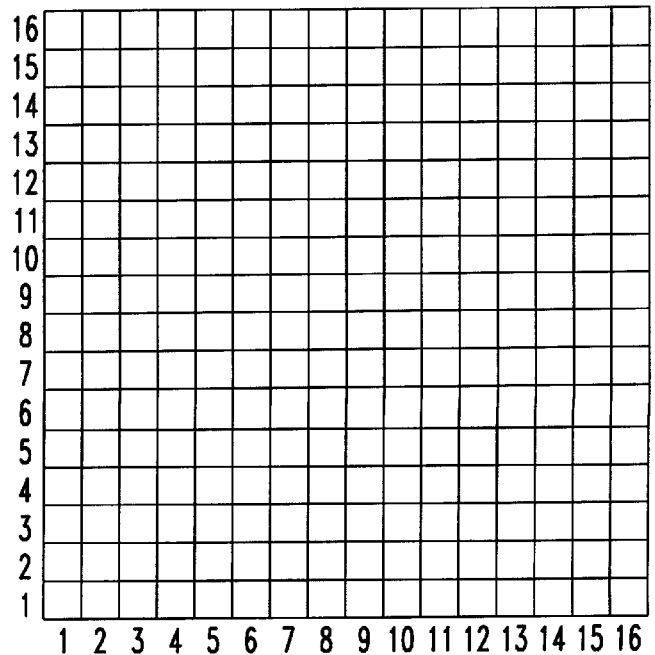
FIG. 3 depicts a drawing of one block of the frame in FIG. 2 and the 16 by 16 array of pixels that constitutes it.
Figure 4:
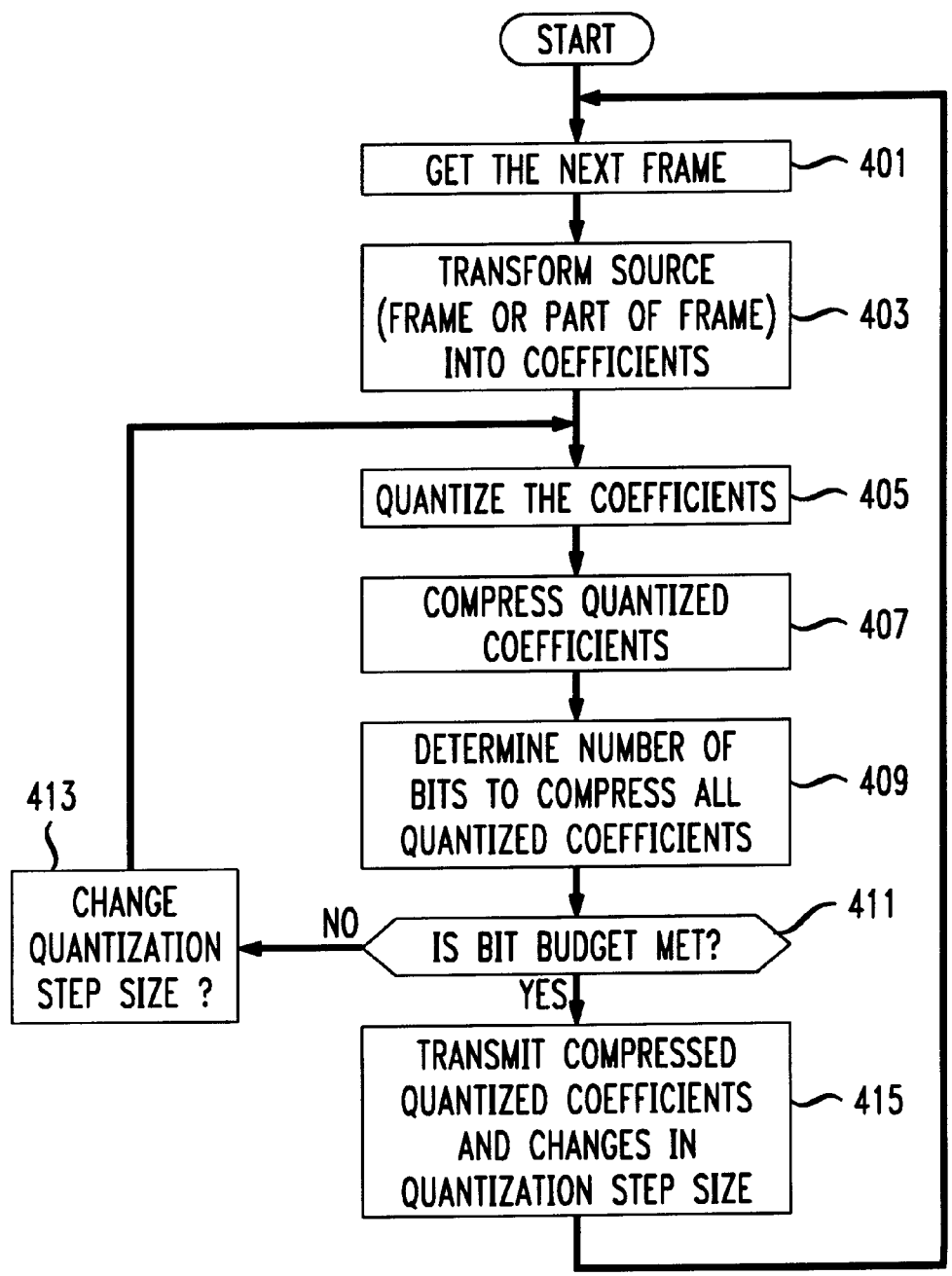
FIG. 4 depicts a flowchart of the salient steps of a video compression technology in the prior art.
Figure 5:
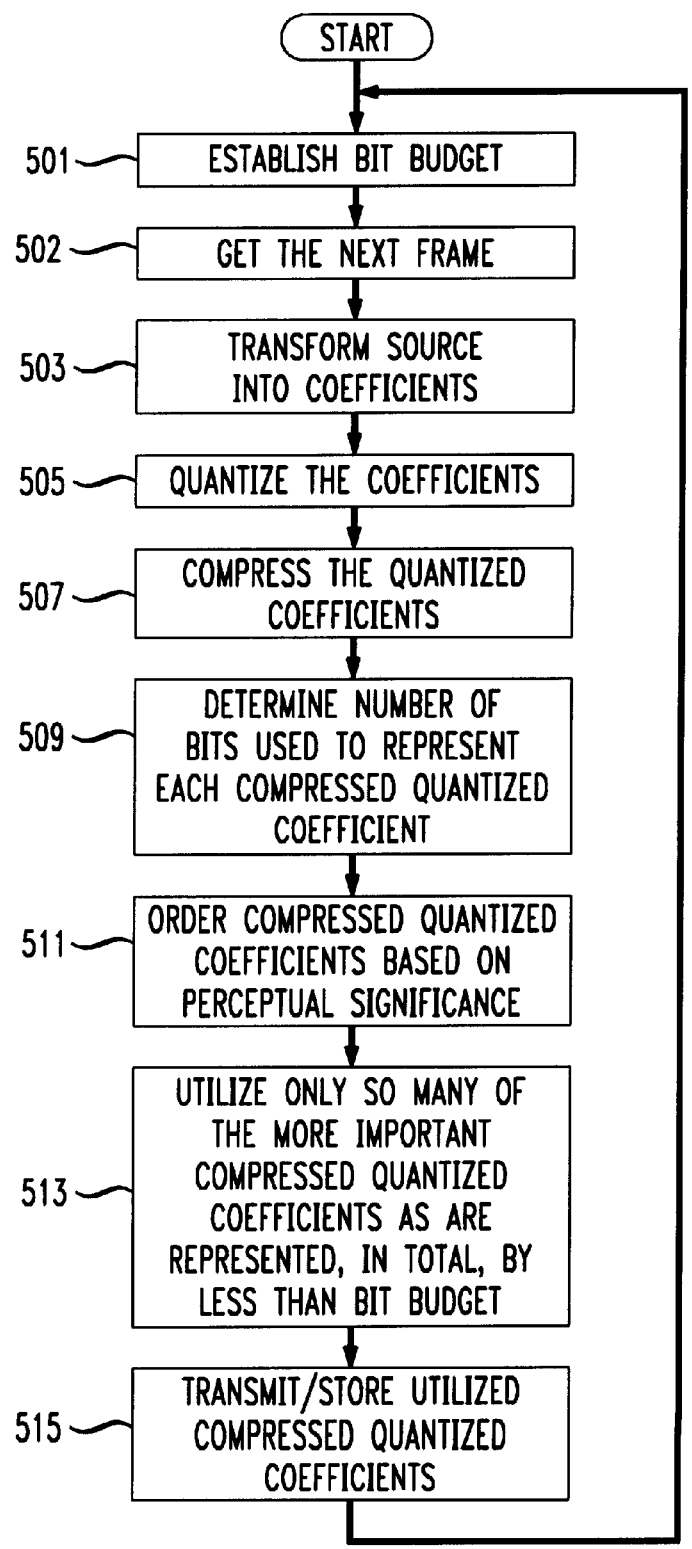
FIG. 5 depicts a flowchart of an illustrative embodiment of the present invention.

FIG. 5 depicts a flowchart of an illustrative embodiment of the present invention as performed by a video processing system. Although the illustrative embodiment compresses rate controls motion pictures, it will be clear to those skilled in the art that other embodiments are capable of compressing still pictures and compressing and rate controlling audio signals.

It will be clear to those skilled in the art that the illustrative embodiment is particularly well-suited to controlling the bit-rate of a compressed video bit-stream. It will be clear to those skilled in the art that embodiments of the present invention can create a bit-stream that is compatible with numerous video compression standards, such as MPEG, ITU H.261 and H.263, among others.

Because the illustrative embodiment treats a frame as an array of blocks and processes each block independently, at step 501, a bit budget is established for each block, in well-known fashion. When other embodiments of the present invention process frames as a whole, or as macro-blocks, it will be clear to those skilled in the art how to establish a bit budget for the frame or macro-block.

The illustrative embodiment of the present invention processes one frame of the motion picture at a time and, therefore, at step 502, the illustrative embodiment gets a frame for processing. In accordance with the illustrative embodiment, each frame comprises an array of 512 by 512 picture elements or "pixels," each of which can depict one of $2^8$ or 256 colors. Furthermore, each frame is treated as an array of 128×128 blocks, each of which comprises an array of 16×16 pixels. It will be clear to those skilled in the art how to make and use embodiments of the present invention in which each frame comprises a different number of pixels or blocks or wherein each pixel represents a different number of colors or both.

At step 503, each block in the frame is transformed into an array of m coefficients, in well-known fashion. The illustrative embodiment performs the discrete cosine transform ("DCT"), in well-known fashion, on each block of 4×4 pixels to create a 4×4 array of m=16 coefficients as depicted in Table 1. It will be clear to those skilled in the art how to make and use other embodiments of the present invention in which a different transformation technique is employed.

TABLE 1

Transform Coefficients

| | | | |
|---|---|---|---|
| $C_{1,1}$ | $C_{1,2}$ | $C_{1,3}$ | $C_{1,4}$ |
| $C_{2,1}$ | $C_{2,2}$ | $C_{2,3}$ | $C_{2,4}$ |
| $C_{3,1}$ | $C_{3,2}$ | $C_{3,3}$ | $C_{3,4}$ |
| $C_{4,1}$ | $C_{4,2}$ | $C_{4,3}$ | $C_{4,4}$ |

At step 505, each of the 16 transform coefficients are quantized with the quantization step size, in well-known fashion, to create 16 quantized coefficients. Initially, the quantization step size is set to an initial value, which advantageously remains constant during the illustrative embodiment. Table 2 depicts the transform coefficients of Table 1 as quantized by the quantization step size, in well-known fashion.

TABLE 2

Quantized Coefficients

| | | | |
|---|---|---|---|
| $QC_{1,1}$ | $QC_{1,2}$ | $QC_{1,3}$ | $QC_{1,4}$ |
| $QC_{2,1}$ | $QC_{2,2}$ | $QC_{2,3}$ | $QC_{2,4}$ |
| $QC_{3,1}$ | $QC_{3,2}$ | $QC_{3,3}$ | $QC_{3,4}$ |
| $QC_{4,1}$ | $QC_{4,2}$ | $QC_{4,3}$ | $QC_{4,4}$ |

At step 507, each of the m quantized coefficients are compressed using a lossless variable-length compression code, such as Huffman Coding, in well-known fashion, to create m=16 compressed quantized coefficients.

At step 509, the number of bits needed to represent each of the m=16 compressed quantized coefficients is determined, in well-known fashion. Table 3 depicts a list of the 16 quantized coefficients of Table 2, and an illustrative number of bits needed to represent each compressed quantized coefficient.

TABLE 3

Bits Required for Each Compressed Quantized Coefficient

| Compressed Quantized Coefficient | Number of Bits in Compressed Quantized Coefficient |
|---|---|
| $QC_{1,1}$ | 2 |
| $QC_{1,2}$ | 5 |
| $QC_{1,3}$ | 3 |
| $QC_{1,4}$ | 1 |
| $QC_{2,1}$ | 3 |
| $QC_{2,2}$ | 2 |
| $QC_{2,3}$ | 2 |
| $QC_{2,4}$ | 6 |

TABLE 3-continued

Bits Required for Each Compressed Quantized Coefficient

| Compressed Quantized Coefficient | Number of Bits in Compressed Quantized Coefficient |
|---|---|
| $QC_{3,1}$ | 3 |
| $QC_{3,2}$ | 8 |
| $QC_{3,3}$ | 3 |
| $QC_{3,4}$ | 2 |
| $QC_{4,1}$ | 4 |
| $QC_{4,2}$ | 5 |
| $QC_{4,3}$ | 7 |
| $QC_{4,4}$ | 4 |

At step 511, the illustrative embodiment orders the 16 compressed quantized coefficients based on their perceptual significance, in accordance with a model of perception. As is well-known to those skilled in the art there are many models of audio and visual perception. The illustrative embodiment of the present invention utilizes one well-known model in which the lower-frequency coefficients of a discrete cosine transform are considered more perceptually significant that the higher-frequency coefficients. For example, as is well-known in the art, the transform coefficient $C_{1,1}$ is the most perceptually significant coefficient in Table 1. Next, the transform coefficients $C_{1,2}$ and $C_{2,1}$ are of equal perceptual significance to each other, but of less significance than the transform coefficient $C_{1,1}$, yet more perceptually significant than the remaining transform coefficients. In other words, the relative perceptual significance of a discrete cosine transform coefficient $C_{ij}$ is related to the quantity i+j.

Table 4 depicts the relative perceptual significance of each of the 16 compressed quantized coefficients in Table 2.

TABLE 4

Relative Ranking of Perceptual Significance

| | | | |
|---|---|---|---|
| 1 | 2 | 3 | 4 |
| 2 | 3 | 4 | 5 |
| 3 | 4 | 5 | 6 |
| 4 | 5 | 6 | 7 |

In accordance with the illustrative embodiment, in step 511, each of the 16 compressed quantized coefficients are ordered distinctly, without ties, based on the relative ranking of perceptual significance in Table 4. It will be clear to those skilled in the art that step 511 can occur at any time before step 513 and need only be done once, because the ranking need not change during the course of the compression process. For example, step 511 can occur before step 502.

For example, although the transform coefficients $C_{1,2}$ and $C_{2,1}$ occupy the second and third locations on the list, either can be chosen as second and third. Table 5 depicts the ranking of the 16 compressed quantized coefficients, without ties, in accordance with the illustrative embodiment of the present invention. It will be clear to those skilled in the art which other absolute rankings are acceptable that are consonant with the relative ranking in Table 4.

TABLE 5

Absolute Ranking of Perceptual Significance

| | | | |
|---|---|---|---|
| 1 | 3 | 6 | 10 |
| 2 | 5 | 9 | 13 |
| 4 | 8 | 12 | 15 |
| 7 | 11 | 14 | 16 |

For example, Table 6 is an alternative absolute ranking of the transform coefficients that is within the relative ranking in Table 4.

TABLE 6

Alternative Absolute Ranking of Perceptual Significance

| | | | |
|---|---|---|---|
| 1 | 2 | 6 | 8 |
| 3 | 4 | 7 | 12 |
| 5 | 9 | 13 | 14 |
| 10 | 11 | 15 | 16 |

Combining Tables 3 and 5 produces Table 7, which is the 16 compressed quantized coefficients and the number of bits in the coding of the coefficients as ordered by perceptual significance in Table 5.

TABLE 7

Compressed Quantized Coefficients
(Ordered Based on Perceptual Significance)

| Compressed Quantized Coefficient | Number of Bits in Compressed Quantized Coefficient |
|---|---|
| $QC_{1,1}$ | 2 |
| $QC_{2,1}$ | 3 |
| $QC_{1,2}$ | 5 |
| $QC_{3,1}$ | 3 |
| $QC_{2,2}$ | 2 |
| $QC_{1,3}$ | 3 |
| $QC_{4,1}$ | 4 |
| $QC_{3,2}$ | 8 |
| $QC_{2,3}$ | 2 |
| $QC_{1,4}$ | 1 |
| $QC_{4,2}$ | 5 |
| $QC_{3,3}$ | 3 |
| $QC_{2,4}$ | 6 |
| $QC_{4,3}$ | 7 |
| $QC_{3,4}$ | 2 |
| $QC_{4,4}$ | 4 |

At step 513, only n of the m=16 compressed quantized coefficients are used (ie., transmitted or stored) so as to not exceed the bit budget for the source object. The n compressed quantized coefficients are chosen from the m compressed quantized coefficients so that: (1) the n compressed quantized coefficients are more perceptually significant overall than the m−n compressed quantized coefficients not used, and (2) the n compressed quantized coefficients require fewer bits, in total, than the bit budget.

When, for example, the bit budget is 45 bits, the first 12 compressed quantized coefficients in Table 7, which use 41 bits, are used because that is the greatest number of most significant coefficients that use fewer bits than the bit budget. The remaining 4 compressed quantized coefficients are discarded.

At step 515, the n used compressed quantized coefficients are transmitted or stored, as appropriate, in well-known fashion.

After step 515, control returns to step 501 where the process repeats. Because the quantization step size is not altered in accordance with the illustrative embodiment, it need not be transmitted or stored with the compressed image. Hence, the rate control algorithm can vary n (the number of quanitized coefficients encoded) from frame to frame, but the quantizer step size remains constant. The significant difference here is that changes in n do not need to be explictly conveyed to the decoder, as the bit-stream syntax itself indicates the end of each encoded block, while changes in the quantizer step size do need to be conveyed to the decoder. Thus, the illustatratice embodiment has a clear advantage over the prior art in the case of error prone channels where the transmission of the quantizer step size can be lost.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method for controlling the bit-rate of a transmitted signal that represents a frame, said method comprising:
   establishing a bit budget for a block, wherein said block is at least a portion of said frame;
   transforming said block into m coefficients;
   quantizing said m coefficients with a quantization step size to create m quantized coefficients;
   compressing said m quantized coefficients to create m compressed quantized coefficients; and
   transmitting n of said m compressed quantized coefficients, wherein said n compressed quantized coefficients are more perceptually significant overall than the m−n compressed quantized coefficients not used, and wherein said n compressed quantized coefficients require, in total, fewer bits than said bit budget.

2. The method of claim 1 further comprising the step of discarding said m−n compressed quantized coefficients not used.

3. The method of claim 1 wherein said method is part of a motion-compensated discrete cosine transform video processing system.

4. A video processing system for controlling the bit-rate of a transmitted signal that represents a compressed motion-picture;
   CHARACTERIZED IN THAT:
   a bit budget is established for a block, which block is at least a portion of a frame;
   said block is transformed into m coefficients;
   said m coefficients are quantized with a quantization step size to create m quantized coefficients;
   said m quantized coefficients are compressed to create m compressed quantized coefficients; and
   n of said m compressed quantized coefficients are transmitted, wherein said n compressed quantized coefficients are more perceptually significant overall than the m−n compressed quantized coefficients not used, and wherein said n compressed quantized coefficients require, in total, fewer bits than said bit budget.

5. The apparatus of claim 4 further CHARACTERIZED IN THAT said block is transformed with a discrete cosine transform.

6. The apparatus of claim 4 further CHARACTERIZED IN THAT said n compressed quantized coefficients are stored in a non-volatile medium.

* * * * *